Nov. 28, 1950  
G. JACOBS  
INTERMITTENT COMBUSTION SPARK  
IGNITION AIRCRAFT HEATER  
2,531,939
Filed Feb. 13, 1948
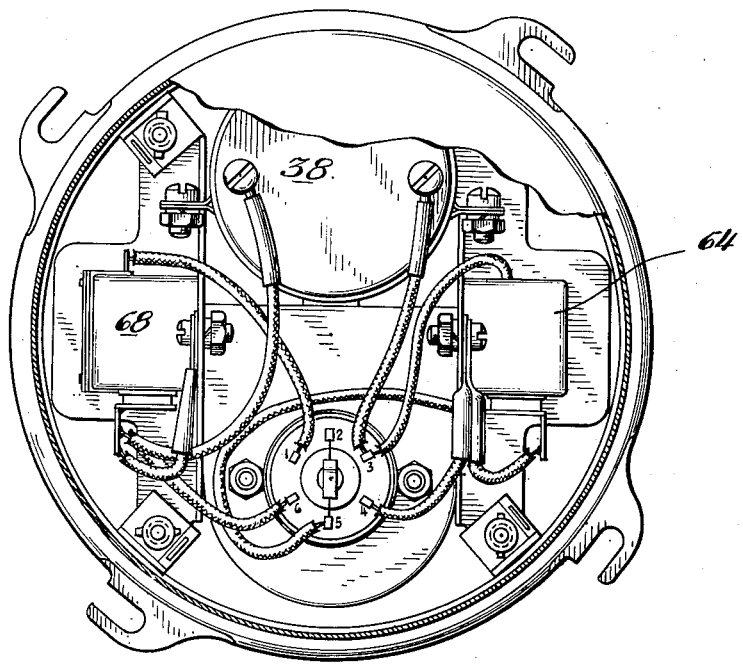
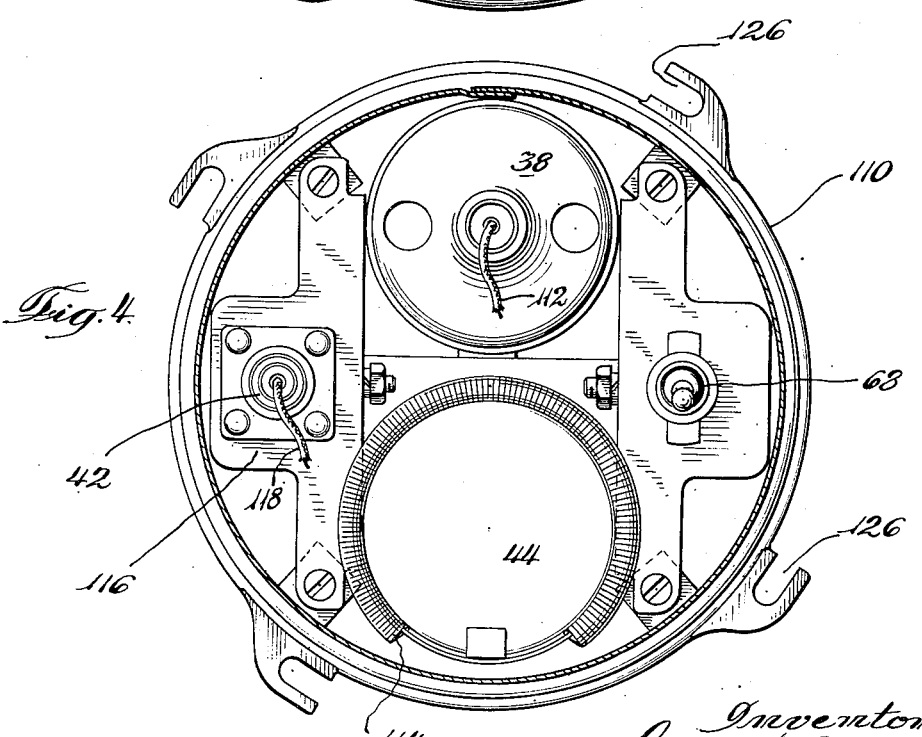
Inventor  
Gerald Jacobs  
By Hinkle, Horton, Adelberg, Hausmann & Wupper  
attorneys Inventor:
Gerald Jacobs Patented Nov. 28, 1950

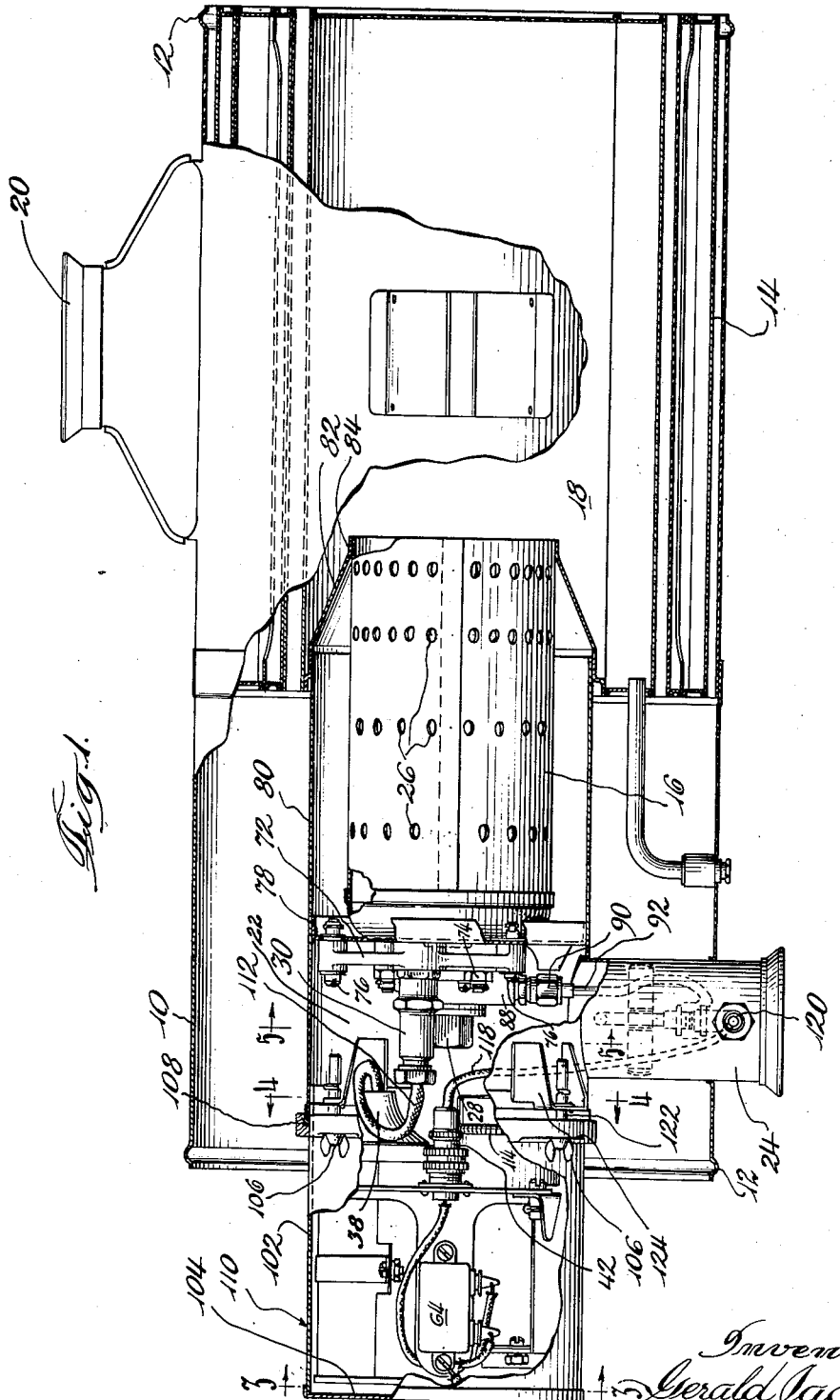

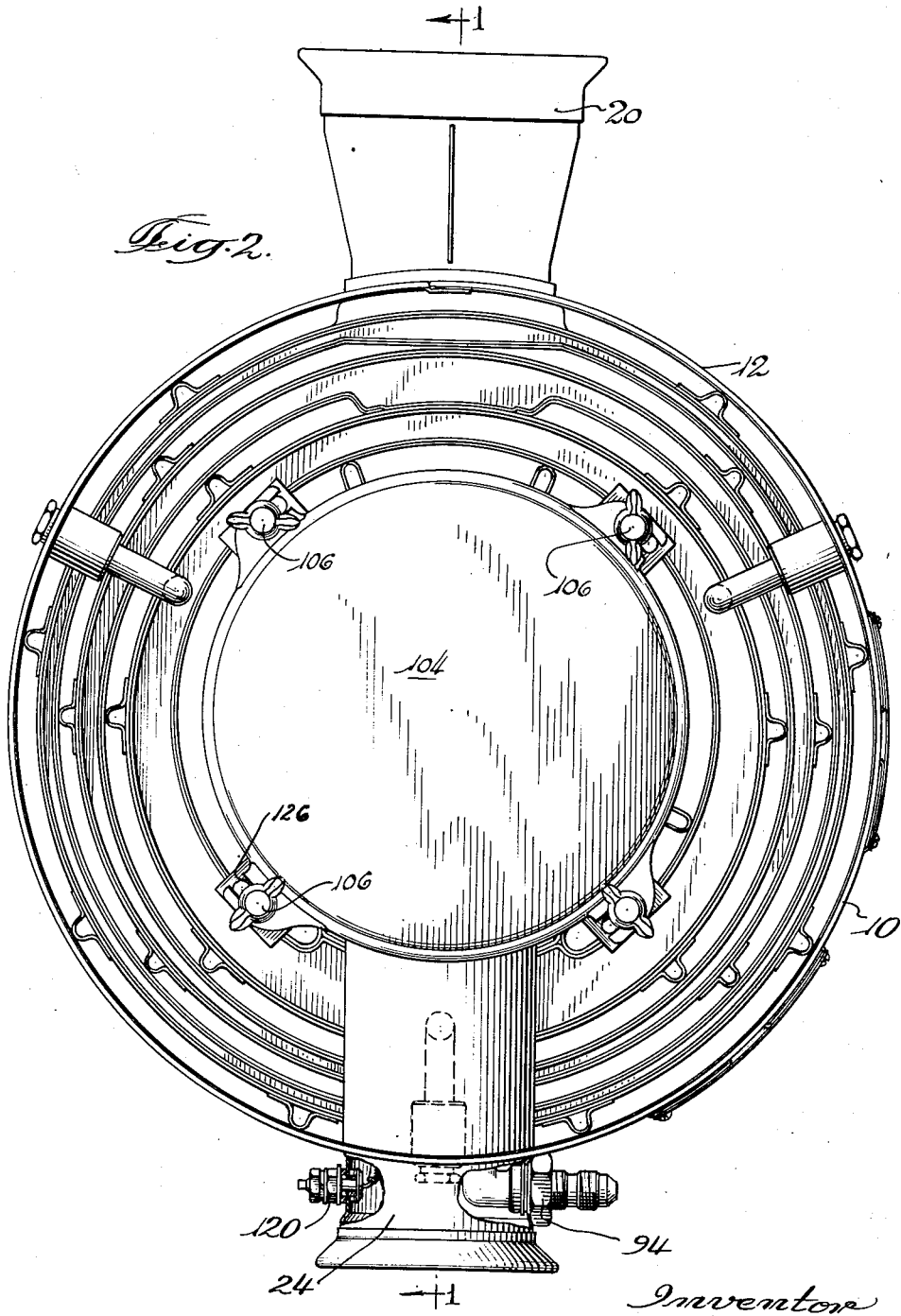

2,531,939

UNITED STATES PATENT OFFICE 2,531,939

INTERMITTENT COMBUSTION SPARK IGNITION AIRCRAFT HEATER

Gerald Jacobs, Indianapolis, Ind., assignor to Stewart-Warner Corporation, Chicago, Ill., a corporation of Virginia Application February 13, 1948, Serial No. 8,106

5 Claims. (Cl. 126—116)

1

The present invention relates to aircraft heaters of the sealed internal combustion type and is directed more particularly to a heater of this type which operates intermittently in order to maintain a predetermined ventilating air temperature, the invention being primarily concerned with the general organization of the apparatus such that the weight and space limitations of the equipment are kept at a minimum and further in so organizing the equipment that the ignition system is positive in its operation and does not cause radio interference in spite of the fact that the ignition is of the high voltage spark type.

One object of the present invention is to provide an aircraft heater of the straight through duct type having all of the ignition apparatus compactly arranged and confined within a container axially arranged with respect to the burner and disposed within and coaxial with the ventilating air duct.

Yet another object of the present invention is to provide a novel heater of the type described which overcomes the disadvantages associated with prior heaters in which the ignition system is divided so that a portion thereof is remotely located with respect to the burner.

Still another object of the present invention is to provide an improved aircraft heater in which all of the ignition equipment may be quickly and easily removed for inspection and servicing.

Still another object is to provide a novel aircraft heater having spark ignition in which the portion of the apparatus most likely to give difficulties in service is arranged in duplicate together with a convenient means for dividing the operating load between the duplicated portions of the apparatus.

Other objects and advantages will become apparent from the following description of a preferred embodiment of my invention which is disclosed in the accompanying drawings.

In the drawings, in which similar characters of reference refer to similar parts throughout the several views:

Fig. 1 is a composite view of a heater embodying the present invention being partly in elevation and partly in longitudinal vertical section;

Fig. 2 is an end view of the device illustrated in Fig. 1;

Fig. 3 is an end view of a portion of the ignition apparatus and may be considered as taken in the direction of the arrows substantially along the line 3—3 of Fig. 1;

Fig. 4 is a view of the other end of the ignition apparatus and may be considered as taken in the direction of the arrows substantially along the line 4—4 of Fig. 1;

Figure 5:
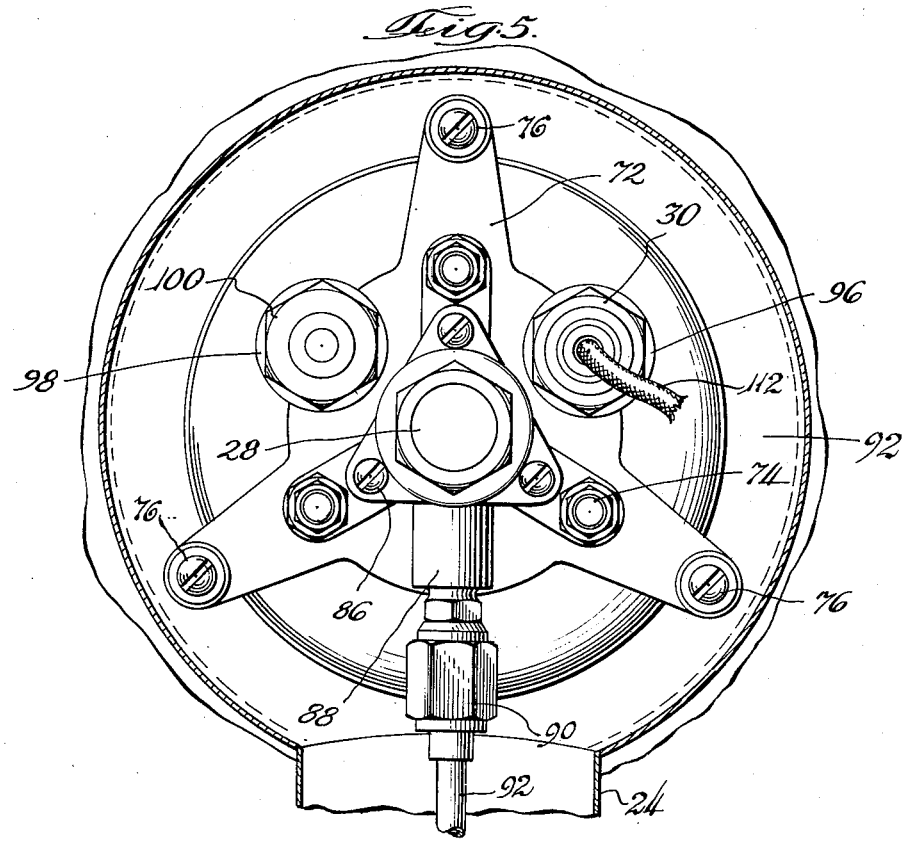
Fig. 5 is a plan view of the outside end of the burner and is taken in the direction of the arrows substantially along the line 5—5 of Fig. 1.

An aircraft combustion heater of the type to which the present invention pertains is made up of a length of cylindrical duct or casing 10 having beads 12 formed at its ends so that a ventilating air inlet duct may be connected to one of these beads while the section of ductwork leading to the space to be heated is connected to the bead at the other end of the casing. Air is supplied to the duct leading to the casing 10 by a scoop or ram located in the airplane slip stream.

A heat exchanger 14 is disposed within the duct 10 and has passages therein to permit the flow of ventilating air lengthwise therethrough in heat exchange relation to hot products of combustion supplied by a burner 16. In the arrangement shown the products of combustion from the burner pass into the axial center 18 of the heat exchanger at one end and then pass outwardly through circuitous passages to an exhaust fitting 20 which is connected to an exhaust pipe leading through the aircraft wall to the slip stream outside the aircraft. In the arrangement shown, the burner 16 is disposed axially within the casing 10 and has a cylindrical combustion air casing or plenum chamber 22 connected on its inlet side to a fitting 24 which leads radially through the wall of the casing 10 to a combustion air inlet pipe connected at its opposite or inlet end to a small scoop or ram located in the aircraft slip stream. Air for combustion, therefore, passes into the scoop, not shown, and thence to the fitting 24 and thereafter to the plenum chamber 22 and by way of combustion air holes 26 into the combustion chamber where the air is mixed with finely atomized fuel issuing from a nozzle, not shown, the back of the nozzle, however, being indicated by the numeral 28. Ignition is supplied by a spark plug 30 which is threaded into a fitting in the end wall of the combustion chamber such that the spark plug electrodes are arranged in a position where an electric spark between the electrodes will ignite the fuel and air mixture within the combustion chamber.

One system for operating a heater of this general type which has proved to be easily controllable, comparatively free from trouble and to have other important advantages consists of a thermostatic switch sensitive to the temperature of the air in the ventilating duct downstream of the heater which operates to maintain the outlet duct air temperature at a substantially constant and predetermined level by cycling the fuel on and off by means of a simple magnetic fuel valve in series with the switch. With such a system the combustion air flows continuously and the ignition system is always operating so that there is always sparking at the igniter electrodes. The result is that whenever the duct air temperature drops slightly below the predetermined range the control system operates to turn on the fuel. As soon as the fuel issues from the nozzle, it is ignited and burns until the ventilating air temperature rises to the upper limit of the desirable range. As soon as this temperature is reached the control system turns off the fuel and soon thereafter the temperature of the air in the ventilating duct drops so as to turn the fuel back on. Because a heater of the type described has extremely high output characteristics considering the mass of metal in the heat exchanger it will be apparent that the temperature of the ventilating air will rise or fall quite quickly as the fuel is turned on and off and there is therefore little "overshooting" of the desirable temperature range.

Figure 6:
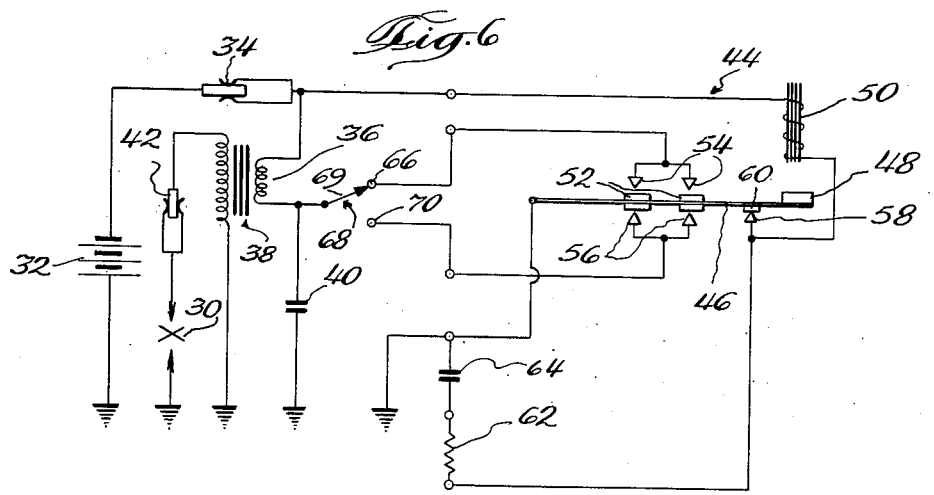
Fig. 6 is an electrical circuit diagram of the ignition system shown mechanically in Figs. 1, 3 and 4.

The heater shown has substantially the ignition system shown diagrammatically in Fig. 6 wherein it will be seen that the aircraft battery 32 is grounded at one side while the other side is connected by way of a quick disconnect 34 to the primary 36 of an ignition transformer 38. The other side of the transformer primary is connected through a capacitor 40 to ground. The secondary of the ignition transformer is connected on one side by a quick disconnect 42 to the spark plug 30, the other side of the spark plug and the other side of the transformer secondary being grounded. The current in the primary of the ignition transformer is rapidly interrupted by a vibrator system indicated generally by the numeral 44. This vibrator system consists of a tuned reed 46 having an armature 48 at its free end which is within the influence of a magnetic field which is formed when an electromagnet 50 is energized. As seen in Fig. 6, the armature 48 moves upwardly when the coil 50 is energized, thereby causing a pair of contacts 52 to be brought against a pair of contacts 54 spaced therefrom while when the coil 50 is de-energized the armature 48 will move away from the coil so as to cause the contacts 52 to be separated from the contacts 54 and to be brought against a second set of contacts 56. Two sets of contacts 54, 52 and 56 are used in parallel so as to insure that good contact will be made when the reed 46 moves and also to provide greater contacting surface for carrying the electric load.

The coil 50 is intermittently energized since one end thereof is electrically connected to the battery by way of the disconnect 34 while the other end is connected to a fixed contact 58 which operates in conjunction with a contact 60 carried by the reed 46. Inasmuch as the reed 46 is grounded, current will flow from the battery 32 by way of a disconnect 34 to the coil 50 and thence by way of the contacts 58 and 56 to the reed 46 and thereafter to ground. The coil 50 is therefore energized and moves the armature 48 upwardly. This separates the contacts 58 and 60 and breaks the circuit through the coil 50 so as to cause the reed to move in the opposite direction, thereby repeating the cycle. In order to reduce the arcing at the contacts 58 and 60 the contact 58 is connected to ground by way of a resistor 62 and capacitor 64 in series.

Contacts 54 are connected to one terminal 66 of a single pole double throw switch 68, the movable member 69 of which is electrically connected between the transformer primary 36 and capacitor 40. Similarly contacts 56 are connected to a second terminal 70 of the single pole double throw switch 68. Assuming that the switch 68 is in the position shown in Fig. 6, that is, that the movable member is in contact with the terminal 66, it will be seen that whenever the armature 48 moves upwardly so as to bring contacts 52 against contacts 54 a circuit will be completed through the transformer primary 36 by way of the battery 32, the disconnect 34, the transformer primary 36, the switch 68, terminals 54 and 52, and thence to ground. As soon as the armature 48 moves downwardly so as to separate contacts 52 and 54 the circuit through the transformer primary 36 will be broken. On the other hand, when the switch 68 is in its alternative position so that it makes contact with terminal 70, it will be noted that exactly the same cycle of operation takes place excepting that the transformer primary will be energized when the armature 48 moves downwardly so as to close contacts 52 and 56 whereas this circuit will be interrupted whenever the armature 48 moves upwardly. The capacitor 40 is connected between ground and the switching side of the transformer primary to reduce arcing at the contacts 52 and 54 or 52 and 56, as the case may be.

Inasmuch as the portion of the mechanism which wears out most rapidly in a system of this character is the contacts 52 and 54 or 56, as the case may be, a switch 68 is provided so that the transformer primary can be energized by way of the contacts 52 and 54 for a number of hours and then by simply throwing the switch 68 to its alternative position the load can be transferred to the contacts 52 and 56. The result of this arrangement is to give the vibrator life characteristics more nearly comparable to that of the remaining portion of the system. It is therefore ordinarily not necessary to remove the ignition system for servicing excepting at times when other portions of the mechanism also should be serviced.

In spite of the fact that an ignition system of the character just described has great advantages in a heating system for use in aircraft, it nevertheless has in the past given serious difficulties which have been overcome at the expense of an abnormally high cost in terms of weight and space requirements of the equipment. This is due largely to the fact that arcing at the contacts 52 and 54 and 56 as well as arcing at the contacts 58 and 60 and the sparking at the electrode 42 all create serious noise in adjacent electronic equipment. As is well known, modern aircraft are equipped with much electronic equipment which is subject to noise interference and therefore elaborate shielding has been necessary in the past in order to enable the use of an ignition system of the type shown. As a matter of fact, the amount of radio interference produced by equipment of this sort unless it is properly and elaborately shielded is more severe than would at first be surmised because aircraft heater spark ignition systems require rather wide spark gaps and high current densities in order to operate properly at high altitude. The result is that at low altitude where these same spark gaps are used because of the difficulty of adjusting the size of the spark gap without the use of elaborate equipment, quite high voltages are required to bridge the gap under the comparatively dense atmospheric conditions prevailing near the surface. The result is that spark ignition systems of this type require abnormally high voltages as well as high current densities.

In the heater of the present invention, the burner shell 16 having the perforations 26 therein is secured at its rearward or closed end to a spider 72 by means of nuts and studs 74, the studs being welded to the shell. The spider in turn is connected at its outer extremities by means of screws 76 to an annular sheet metal flange 78 welded to the internal surface of a cylinder 80 which forms the combustion air plenum chamber previously referred to. At its inner end, that is, the heat exchanger end, the cylindrical shell 80 is welded to a conical ring 82 which tapers inwardly and is formed at its inner edge to provide a flange which is welded to the burner sleeve 16. The cylindrical member 80 extends from the heat exchanger rearwardly past the flange 78 for a short distance to form a section which is connected to the previously referred to combustion air inlet fitting 24. Thus, combustion air passing inwardly through this fitting empties into the rearward extension of the cylindrical sleeve 80 and if the rearward end of this extension is closed the combustion air will pass around the spider 72 and through the opening in the center of the annular flange 78 so as to surround the cylindrical burner shell 16. The air thereafter flows inwardly through the openings 26 since it is prevented from passing into the heat exchanger by the conical ring 82.

At its center the closed end of the combustion chamber 16 has an opening therethrough, not shown, into which the fuel nozzle extends. This fuel nozzle is threaded into a fitting 28 which is secured to the back end of the burner by screws 86. Preferably a gasket is used between these elements. The interior of the nozzle fitting 28 communicates through an extension 88 with the fuel pipe fitting 90 which in turn is connected by a short length of tubing 92 to a bulkhead type fitting 94 extending through the side wall of the combustion air inlet fitting 24 at a position outside of the cylindrical heater shell 10. This arrangement permits all of the connections to the nozzle to be made and tested before the heater is mounted within the aircraft so that once the heater is in place the fuel line needs to be connected only to the fitting 94.

The rearward end of the combustion chamber is also provided with a threaded boss 96 into which the spark plug 30 is secured with its electrodes properly disposed. If desired, a second similar boss 98 may be secured to the combustion chamber at another point so as to permit the use of an emergency igniter. Such an emergency igniter is frequently of the hot wire type and is used only if the principal ignition system fails. Since this igniter forms no part of the present invention and is not necessary in order to produce an operative device the opening in this boss is simply shown as closed by a plug 100 in the accompanying drawings.

A short sheet metal can comprised of a cylindrical wall member 102 closed by a flat flanged bottom 104 is disposed in axial alignment with the cylindrical sleeve 80 and is joined thereto by wing nuts 106, the joint being sealed by a gasket 108. The metal can indicated generally by the numeral 110 has substantially the same diameter as the sleeve 80 and therefore does not interfere with the flow of ventilating air through the casing 108. Although it extends somewhat beyond the bead 12 at the end of the shell 10 it will nevertheless be enclosed in the metal ventilating air ductwork which connects at the bead 12. This can serves as a closure for the back end of the plenum chamber 22 so as to force the air for combustion to pass through the holes 26 and further serves to seal the combustion side of the heater from the ventilating air side so that any fuel leakage beyond the fitting 94 will cause fuel liquid or vapor merely to pass into the combustion air plenum chamber where it passes with the combustion air through the holes 26 into the burner. Any escaping fuel, therefore, cannot contaminate the ventilating air. In addition the can 110 serves to house, mount and shield the entire ignition circuit shown in Fig. 6 with the exception of battery 32 and the electrical lead therefrom.

The ignition coil 38 is mounted by brackets in the upper portion of the can 110 in a horizontal position with its high voltage terminal disposed adjacent the spark plug 30. A very short lead 112 therefor serves to connect the high tension terminal of the coil to the spark plug. The amount of shielded cable necessary, therefore, is held to a minimum, thereby reducing weight to a considerable extent since suitable cable of this type is very heavy. The vibrator mechanism 44 is located within a cylindrical can and is disposed in a position directly beneath the ignition coil 38 and is retained in an appropriate location by a loop of coil spring 114 which is simply stretched sufficiently to permit placement of the vibrator 24 within the loop after which the spring contracts to retain the vibrator 24 in place. The capacitor 64 which serves to inhibit arcing at the contacts 52, 54 and 56 is mounted alongside and below the coil 38 so as to fit within the portion of the casing at about its horizontal diameter. The similar space at the other side of the casing is taken up by the switch 68 which is of the toggle type and which has its lever within easy reach when the can 110 is removed from the back end of the burner casing. One half of the quick disconnect 42 is mounted upon a bracket 116 in a position opposite the handle of switch 68 so that when the can 110 is removed from the burner the half of the disconnect thus revealed may easily be attached or removed from the other half, best seen in Fig. 1, this second half being connected in turn by a lead 118 to an insulated terminal 120 extending through the side wall of the combustion air fitting 24 directly opposite the fuel fitting 94.

The wing nuts 106 which retain the ignition system container in place are threaded upon studs 122 which are attached to brackets 124 welded to the sides of the shell 80. These studs pass into bayonet type slots 126 in the fitting secured to the inner end of the container 110. It is apparent, therefore, that the entire ignition system for the heater can be removed simply by loosening the four wing nuts 106 and then rotating the can slightly in a clockwise direction so as to disengage the bayonet slots 126 from the studs 122. Thereafter, the container may be moved outwardly away from the burner slightly so as to permit the ignition cable 112 to be disconnected from the spark plug and to enable the quick disconnect 42 to be separated. Thereafter, the container 110 with all of the ignition apparatus therein with the exception of the spark plug may be carried away with the heater for servicing. After the can has been removed as just described it is apparent also that the fuel nozzle and the spark plug may easily be removed for servicing. Thus, in a few minutes' time, all of the portions of the aircraft heater which might require servicing or periodic checking can be removed from the airplane and taken to a shop where the work may be done more conveniently. Whenever it is desired to shift the ignition system from contacts 54 to contacts 56, for instance, it is necessary merely to loosen the four wing nuts 106, rotate the can 110 slightly, and then move the can outwardly sufficiently to permit the switch 68 to be moved to its alternative position after which the can is easily replaced.

Inasmuch as the cable leading from the ignition coil to the spark plug is extremely short and since all of the arcing and sparking mechanism is located either within the metal heater or within the metal can 110 and since in turn these elements are located within the grounded metal ventilating air ductwork it is apparent that very little radio interference will be radiated from its source so as to cause noise in electronic equipment in the aircraft. Therefore, no elaborate additional shielding has been found to be necessary and the weight of the entire equipment is much less than was formerly considered necessary and further no serious space limitation is imposed upon the aircraft since all of the ignition equipment is located within the ventilating air casing in axial alignment with the burner where it does not substantially interfere with the flow of ventilating air to the heater.

Although I have described and illustrated only one embodiment of my invention, it will be appreciated that variations may be made therefrom without departing from the scope of the invention and it is to be understood, therefore, that the scope of the invention is to be measured by the appended claims.

Having described my invention, what I claim as new and useful and desire to secure by Letters Patent of the United States is:

1. In a heater of the type described, means forming a cylindrical ventilating air duct section adapted to be connected at its ends to a ventilating air distributing system, a heat exchanger disposed within said duct and having ventilating air passages extending longitudinally with respect to said duct, a burner connected at one end of the heat exchanger and axially disposed within said duct, a spark plug extending through a wall of said burner, means forming a portion of a combustion air plenum chamber enclosing the major portion of said burner including said spark plug and extending beyond the rear end of the burner, a combustion air fitting attached to the wall of said portion and extending substantially radially outwardly through the wall of said duct section and serving as a means for introducing combustion air into said plenum chamber, an electric terminal mounted in the wall of said fitting exterior of said duct wall, means forming a container connected to said portion forming means and disposed in a position adjacent the inlet end of said duct section and substantially coaxial therewith for forming a sealed plenum chamber in conjunction with said portion forming means, an ignition transformer disposed within said container, an electric vibrator type circuit breaker also disposed within said container, and quick disconnect means within said container for connecting said ignition transformer to said spark plug, for connecting said transformer and vibrator to said terminal and for connecting said container to said plenum chamber portion forming means.

2. In a heater of the type described, means forming a ventilating air duct section adapted to be connected at its ends to a ventilating air distributing system, a heat exchanger disposed within said duct for heating air passing through said duct, a burner connected at one end of the heat exchanger and spaced from the wall of said duct, a spark plug extending into said burner, means forming a portion of a combustion air plenum chamber associated with said burner, a combustion air fitting attached to the wall of said portion and extending outwardly through the wall of said duct section and serving as a means for introducing combustion air into said plenum chamber, an electric terminal mounted in the wall of said fitting exterior of said duct wall, means forming a container connected to said portion forming means for forming in conjunction therewith a sealed plenum chamber disposed in a position adjacent the inlet end of said duct section and substantially coaxial therewith, an ignition transformer disposed within said container, an electric vibrator type circuit breaker also disposed within said container, and quick disconnect means within said container for connecting said ignition transformer to said spark plug, for connecting said transformer and vibrator to said terminal and for connecting said container to said plenum chamber portion forming means.

3. In a heater of the type described, means forming a ventilating air duct section adapted to be connected at its ends to a ventilating air distributing system, a heat exchanger disposed within said duct for heating air passing through said duct, a burner connected at one end of the heat exchanger and spaced from the wall of said duct, a spark plug extending into said burner, means forming a portion of a combustion air plenum chamber associated with said burner, means forming a container connected to said portion forming means for forming in conjunction therewith a sealed plenum chamber disposed in a position adjacent the inlet end of said duct section and spaced inwardly thereof, an ignition transformer disposed within said container, an electric vibrator type circuit breaker also disposed within said container, and quick disconnect means within said container for connecting said ignition transformer to said spark plug and for connecting said container to said plenum chamber portion forming means.

4. In a heater of the type described, means forming a ventilating air duct section adapted to be connected at its ends to a ventilating air distributing system, a heat exchanger disposed within said duct for heating air passing through said duct, a burner connected at one end of the heat exchanger and radially spaced from the wall of said duct, a spark plug extending into said burner, means forming a portion of a combustion air plenum chamber associated with said burner, means forming a container connected to said portion forming means for forming in conjunction therewith a sealed plenum chamber disposed in a position adjacent the inlet end of said duct section and substantially coaxial therewith, electric circuit means for connection on its input side to a low voltage lead and adapted to transform said low voltage to a high voltage of spark plug operating potential at its output side, all of said circuit means being disposed within said container, and quick disconnect means within said container for connecting the output side of said circuit to said spark plug, for connecting the input side of said circuit to a low voltage lead, and quick disconnect means for connecting said container to said plenum chamber portion forming means.

5. In a heater of the type described, means forming a ventilating air duct section adapted to be connected at its ends to a ventilating air distributing system, a heat exchanger disposed within said duct for heating air passing through said duct, a burner connected to said heat exchanger and disposed within said duct, a spark plug having one end extending into said burner, means forming a portion of a combustion air plenum chamber associated with said burner, means forming a container connected to said portion forming means for forming in conjunction therewith a sealed plenum chamber enclosing the other end of said spark plug, said chamber being positioned adjacent the inlet end of said duct section and being spaced inwardly of the wall of said duct section, electric circuit means for connection on its input side to a low voltage lead and adapted to transform said low voltage to a high voltage of spark plug operating potential at its output side, all of said circuit means being disposed within said container, and quick disconnect means within said container for connecting the output side of said circuit to said spark plug, for connecting the input side of said circuit to a low voltage lead, and quick disconnect means for connecting said container to said plenum chamber portion forming means.

GERALD JACOBS.

REFERENCES CITED

The following references are of record in the file of this patent:

UNITED STATES PATENTS

| Number | Name | Date |
| --- | --- | --- |
| 2,311,404 | Macchi | Feb. 16, 1943 |
| 2,364,214 | Hess et al. | Dec. 5, 1944 |
| 2,454,512 | Heymann | Nov. 23, 1948 |
| 2,458,968 | Williams | Jan. 11, 1949 |